United States Patent
Solheim et al.

(10) Patent No.: US 11,068,550 B2
(45) Date of Patent: Jul. 20, 2021

(54) SEARCH AND NAVIGATION VIA NAVIGATIONAL QUERIES ACROSS INFORMATION SOURCES

(71) Applicant: MICROSOFT TECHNOLOGY LICENSING, LLC, Redmond, WA (US)

(72) Inventors: Helge Grenager Solheim, Oslo (NO); Bjørn Olstad, Stathelle (NO); Johannes Gehrke, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 86 days.

(21) Appl. No.: 14/194,663

(22) Filed: Feb. 28, 2014

(65) Prior Publication Data
US 2015/0248489 A1    Sep. 3, 2015

(51) Int. Cl.
*G06F 16/951* (2019.01)
*G06F 16/9535* (2019.01)
(Continued)

(52) U.S. Cl.
CPC ........ *G06F 16/9535* (2019.01); *G06F 16/248* (2019.01); *G06F 16/90324* (2019.01); *G06F 16/951* (2019.01)

(58) Field of Classification Search
CPC ......... G06F 17/30867; G06F 17/30864; G06F 17/30554; G06F 17/3097; G06F 17/30;
(Continued)

(56) References Cited

U.S. PATENT DOCUMENTS

| 7,890,485 B2 | 2/2011 | Malandain et al. |
| 8,204,888 B2 | 6/2012 | Frieden et al. |

(Continued)

FOREIGN PATENT DOCUMENTS

| WO | WO201302008 | * | 3/2012 | ............ G06F 17/30 |
| WO | WO201302208 | * | 3/2012 | ............ G06F 17/30 |

(Continued)

OTHER PUBLICATIONS

"International Search Report & Written Opinion Received for PCT Application No. PCT/US2015/017616", dated May 4, 2015, 12 Pages.
(Continued)

*Primary Examiner* — Hosain T Alam
*Assistant Examiner* — Tracy M McGhee
(74) *Attorney, Agent, or Firm* — Merchant & Gould P.C.

(57) ABSTRACT

Search and navigation through navigational queries across a variety of information sources is provided. Upon receipt of a search query, a primary search is performed for information responsive to the query. Information responsive to the primary search is then used to browse one or more information sources for other information related to the result of the primary search. Navigational suggestions and navigational elements may be provided in a user interface to allow the searching user to select the result of the primary search and/or to navigate to other information items found for the primary search result from the one or more information sources. Thus, a seamless transition between searching and browsing is enabled where searching and browsing may be accomplished in response to a single searching or browsing action.

20 Claims, 12 Drawing Sheets

(51) Int. Cl.
*G06F 16/248* (2019.01)
*G06F 16/9032* (2019.01)

(58) Field of Classification Search
CPC .. G06F 16/9535; G06F 16/951; G06F 16/248; G06F 16/90324
USPC ................................................ 707/706, 736
See application file for complete search history.

(56) References Cited

U.S. PATENT DOCUMENTS

| | | | | |
|---|---|---|---|---|
| 2007/0244867 | A1* | 10/2007 | Malandain | G06F 16/313 |
| 2010/0161594 | A1 | 6/2010 | Prasad et al. | |
| 2012/0066210 | A1* | 3/2012 | Mukerjee | G06F 16/367 |
| | | | | 707/723 |
| 2013/0066853 | A1* | 3/2013 | Andersson | G06F 17/30991 |
| | | | | 707/722 |
| 2013/0282682 | A1* | 10/2013 | Batraski | G06F 17/30864 |
| | | | | 707/706 |

FOREIGN PATENT DOCUMENTS

| | | | | |
|---|---|---|---|---|
| WO | 2013/020084 A1 | | 2/2013 | |
| WO | WO2013020084 | * | 2/2013 | ....... G06F 17/30867 |
| WO | WO 2013/020084 | * | 7/2013 | .................... 707/736 |
| WO | WO-2013/020084 A1 | * | 7/2013 | .................... 707/736 |

OTHER PUBLICATIONS

Fluit, Christiaan, "AutoFocus: Semantic Search for the Desktop", In Proceedings of the Ninth International Conference on Information Visualisation, Jul. 6, 2005, 8 pages.

"What Metadata in SharePoint is and How to Set Up Metadata Navigation for a List or Library", Published on: Nov. 8, 2013, Available at: http://thinketg.com/what-metadata-in-sharepoint-is-and-how-to-set-up-metadata-navigation-for-a-list-or-library/.

Wang, et al., "Finding Business Information by Visualizing Enterprise Document Activity", In Proceedings of the International Conference on Advanced Visual Interfaces, May 26, 2010, 8 pages.

Li, et al., "Searching for Entities: When Retrieval Meets Extraction", In Proceeding of The Nineteenth Text Retrieval Conference, Nov. 2010, 8 pages.

"PCT Written Opinion of the International Preliminary Examining Authority in International Patent Application No. PCT/US2015/017616", dated Feb. 5, 2016, 7 pgs.

International Preliminary Report on Patentability Issued in PCT Application No. PCT/US2015/017616, dated May 13, 2016, 8 Pages.

\* cited by examiner

Mobile Computing Device

SEARCH AND NAVIGATION VIA NAVIGATIONAL QUERIES ACROSS INFORMATION SOURCES

BACKGROUND

Modern information workers/users create, retrieve and edit information of many different types, for example, documents, images, communications, social interaction information, and the like. When searching for information of various types, users are often in a search mode where they are searching for a given piece of information, e.g., file, image, communication, etc. Alternatively, users may be in a discovery/browsing mode where they are browsing a variety of information items in a collection of related content items or across various unrelated information sources for a piece of information that may be of interest. In a discovery/browsing mode, users are often not aware of a particular piece of content or information, but are simply browsing available content hoping a piece of content will surface that may be helpful in some way. Unfortunately, transitioning between a search mode and a discovery/browsing mode typically is cumbersome and inefficient. For example, a user may search for a particular document, and upon learning about various aspects of the document (e.g., specific document content items or identification information for the document's creator, etc.), the user may then launch a browsing function to discover additional information about the specific document content items. For example, the user may browse on the document creator to learn about other documents the document creator has produced or to learn information about the document creator or other persons associated with the document creator. It would be advantageous to provide methods, systems and/or articles of manufacture to enable navigational queries for discovering/browsing additional information about a searched item in response to a query on the searched item. It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention are directed to search and navigation through navigational queries across a variety of information sources. Upon receipt of a search query, a primary search is performed for information responsive to the query, e.g., a search for a particular document, person or other content item. Information responsive to the primary search is then used to browse one or more information sources for other information related to the result of the primary search. Navigational elements may be provided in a user interface to allow the searching user to select the result of the primary search and/or to navigate to other information items found for the primary search result from the one or more information sources. For example, in response to a primary search on a particular document, other documents may be found that are related to the searched particular document, and navigational elements may be presented to allow the user to not only select review and/or utilize the particular document but to allow the user to navigate to the other documents that are discovered as being related to the particular document.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings which are incorporated in and constitute a part of this disclosure, illustrate various embodiments of the present invention.

DETAILED DESCRIPTION

Figure 1:
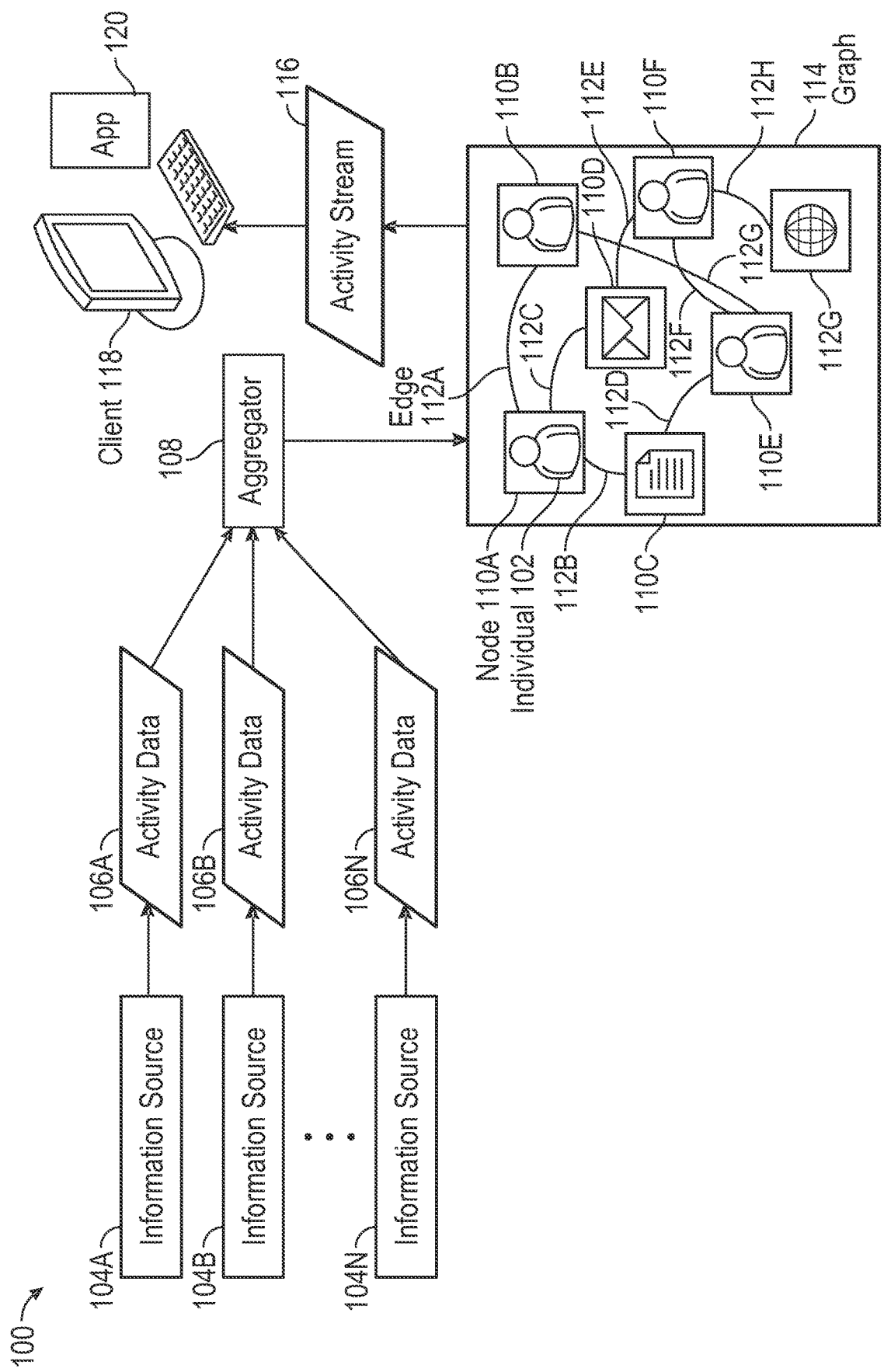
FIG. 1 is a block diagram of one embodiment of a system for gathering and aggregating information across a variety of information sources that may be provided as additional information for a particular search.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

As briefly described above, embodiments of the present invention are directed to search and navigation through navigational queries across a variety of information sources. Upon receipt of a search query, a primary search is performed for information responsive to the query, e.g., a search for a particular document, person or other content item. Information responsive to the primary search is then used to browse one or more information sources for other information related to the result of the primary search. Navigational elements may be provided in a user interface to allow the searching user to select the result of the primary search and/or to navigate to other information items found for the primary search result from the one or more information sources.

According to embodiments, navigational queries may be queries with additional elements associated with search results from a primary search on a given information item, such as a document or person. Additional elements may be entities dominant in the information items (e.g., documents) browsed in the one or more information sources. Additional elements also may be activities associated with the information items (e.g., utilization of information items, commenting or other social interaction with information items, etc.). Results of searches and results of browsing to an information source, for example, a document folder, results in the same look and feel. According to embodiments, there may be no distinction between searching and browsing navigation where both functions may return both search results and additional navigational elements/paths according to embodiments. Alternatively, a seamless transition between searching and navigation may be provided in a single user interface/user experience. For example, browsing to a document folder may be considered a search query for all documents in that folder. Navigational queries are shown for each document and for the collection of documents in the folder. Regular search results (e.g., results of a keyword query) may be shown with the same navigational possibilities and not richer or poorer than the user experience for searching a folder.

The one or more information sources that may be browsed for additional information may include a variety of sources, and entities (e.g., text, images, patterns, metadata, etc.) may be extracted from information items in those sources for use in browsing additional information via navigational queries. The one or more information sources may include structured resources such as document file folders organized according to a desired structure. For example, an explicit tenant-specific taxonomy in the form of a manually created and managed file structure may be parsed for information that may be related to a primary search result. Such additional information sources may also include a collection of information items analyzed and aggregated in a knowledge graph that may contain documents, people information, communications information, social networking information, and the like that may be related to a given primary search item and that may be surfaced as a navigational elements or queries. In addition, clustering between documents/information items and similar terms in other information items may be discovered and may be utilized for providing navigational elements to additional information. For example, documents or other information items that may be clustered in a workload or information source for no specific reason may nonetheless be provided as navigation suggestions when a given item in the cluster is searched. In addition, pattern recognition in text/content of a searched item may also be used for providing additional searching or browsing for additional information related to a primary search item. As should be appreciated, these are but some examples of different information sources that may be browsed for discovering additional information that may be navigated to for additional information associated with a primary search item.

According to embodiments, when a search is performed on an information item, for example a document, other content item, person, etc. a search result may be surfaced to the searching user and information (also described herein as entities) from the search results may be used for discovery/browsing functions for providing the searching user with navigational paths or elements with which to navigate to additional information relevant to the searched item. For example, in response to a search for a particular document, entities from the document (e.g., text, images, metadata, etc.) and entities associated with the document (e.g., document author, editor, social commentary on the document, etc.) may be used for generating discovery/browsing functions for surfacing additional information to the searching user. For example, in response to a search on the particular document, a navigation element may be provided for allowing a user to navigate to related documents or to information about the people who have been associated with the document. In addition, according to embodiments, a navigation element may be provided for allowing a user to navigate to a query that shows all documents or other content items in a document library or other information repository in which the search result item is stored, for example, a local or remote information storage drive or server or a local or remote shared information storage system.

In order to obtain such information for a searched item, according to one embodiment, aggregating information (also referred to as an activity stream) about a searched item may be necessary. FIG. 1 is a block diagram illustrating a system architecture 100 for providing an activity stream across multiple information sources for aggregating information that may be built into a knowledge graph from which information associated with a searched item may be discovered. The system architecture 100 includes an aggregator 108 operable to collect activity data 106A-N (collectively 106) for an individual 102 or group of individuals from a plurality of information sources 104A-N (collectively 104) and store the activity data 106 in a graph 114. The information sources 104 may include various types of information sources such as social networking services, enterprise social network services, online productivity application services and software services, collaboration services, communication software, etc.

Activity data 106 may comprise various types of information such as, but not limited to, presence data, data associated with authoring or modification of an information item (e.g., document), trending data, feedback data (e.g., like, comment, follow, share, etc.), data associated with organizational structure (e.g., who an individual works with, works for, interacts with, is a peer to, directs, manages, is managed by, has in common with another individual, etc.). As mentioned above, the activity data 106 may be stored in a graph 114. Actions may be stored as edges 112A-H (collectively 112), and entities that are acted upon may be stored as nodes 110A-G (collectively 110). For example, a node 110 may include an individual 102 (nodes 110A,B,E, F), a group of individuals, a document (node 110C), an email or other communication type (node 110D), a webpage (node 110G), etc. An edge 112 may include various types of actions (e.g., like, comment, follow, share, authoring, modifying, organizational relationship, communication, participation, etc.). Consider for example that an individual 102 "likes" a certain document (i.e., selects a "like" option associated with the document). The individual and the document may be stored as nodes 110 and the "like" selection may be stored as an edge 112.

A user 122 may selectively view enterprise activity for an individual 102 or group. According to embodiments, a group may be a formalized set of individuals according to an organizational hierarchy or project structure, or may be a less formally coupled set of individuals such as a group of individuals who are common attendees of a particular meeting, a project group, a group of individuals who share a common interest in a particular topic, etc. An individual 102 may be a part of a plurality of groups. The user 122 may utilize a client application 120 on a computing device 118 to request an activity stream 116 as part of a search or browsing action as described herein. According to one embodiment, a request may be triggered via navigation to or selection of a representation of an individual 102 or group from a user interface, for example, a user interface displayed on computing device 118 via client application 120.

The computing device 118 may be one of a variety of suitable computing devices described below with reference to FIGS. 6 through 8. For example, the computing device 118 may include a tablet computing device, a desktop computer, a mobile communication device, a laptop computer, a laptop/tablet hybrid computing device, a gaming device, or other type of computing device for executing applications 120 for performing a variety of tasks.

The search/navigation application 120 illustrated in association with computing device 118 is illustrative of any application having sufficient computer executable instructions for enabling embodiments of the present invention as described herein. The application 120 may include a thick client application, which may be stored locally on the computing device 118, or may include a thin client application (i.e., web application) that may reside on a remote server and accessible over a network, such as the Internet or an intranet. A thin client application may be hosted in a browser-controlled environment or coded in a browser-supported language and reliant on a common web browser to render the application executable on a computing device 118.

According to embodiments, the application 120 may include a search engine operative to perform a search on one or more information sources for information responsive to a search query as described below with reference to FIGS. 2A-4B. In addition, the application 120 may include or may be operative to access a browsing engine for browsing one or more information sources for information related to or associated with a search query or results of a search query. The search engine and the browsing engine may be part of a single application 120 or may be remotely located and accessible by the application 120. In addition, according to embodiments, a search query that leads to navigational queries for additional information may be initiated via the browsing engine in place of the search engine, and navigational queries for additional information may be surfaced in response to information initially returned from the browsing engine.

In response to a search query, a request for an activity stream may be received for determining additional information that may be used for generating navigational queries and navigation elements that may be presented to the user as described below. When a request for an activity stream 116 for an individual 102 or a group is received, the graph 114 may be parsed for the particular individual 102 or group, actions of the individual 102 or group (stored as edges 112), and entities that were acted upon (stored as nodes 110). The request for an activity stream 116 may be a search API, and may comprise authorization information for determining what content the user 122 has been granted access to receive. A response may be generated and may comprise an activity stream 116 of activity (associated with the individual 102 or group) to which the user 122 has been granted access. The activity stream 116 may be provided to the search/navigation application 120 and be used for generating navigational queries based on the received search query as described below.

Figure 2A:
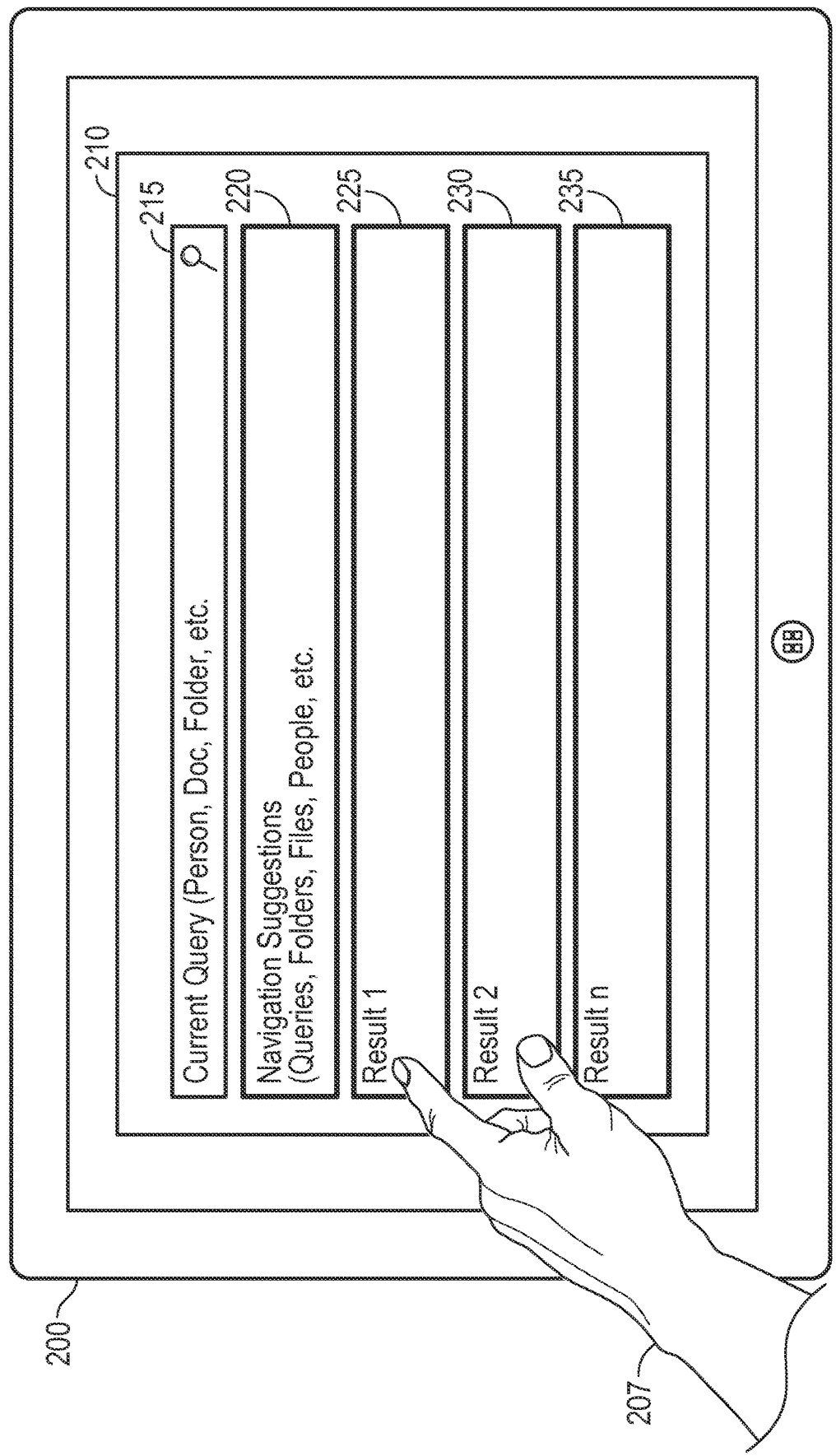
FIG. 2A illustrates an example user interface for initiating a search query and for receiving one or more navigation suggestions and search query results.

FIG. 2A illustrates an example user interface for initiating a search query and for receiving one or more navigation suggestions and search query results. As illustrated in FIG. 2A, a free text query may be entered by a searching user in the current query box or field 215. For example, a free text query such as a document name, text that may be contained in a document, a person's name, an object identification, for example, an image, photograph, physical object, and the like may be entered as a free text query in the box/field 215. According to embodiments, natural language processing may be performed on the free text query, and a text-based search query may be utilized for searching a variety of information sources, described above, for information responsive to the search query. For example, if the free text entry includes a document name, the entry may be used for locating and surfacing the searched document for the searching user. Alternatively, if a free text string such as "information about Tom Jones" is entered in the field 215, natural language processing of the entered search query may be utilized for isolating the name "Tom Jones" for performing a search of one or more information sources for information on the example person "Tom Jones".

In response to initiating a search via the free text box/field 215, a navigation suggestions field 220 may be populated with one or more suggested navigation queries that may be selected and/or entered into the current query box/field 215. For example, in response to a given free text query, a number of navigation suggestions may be provided to suggest that the user follow one or more navigation paths for finding additional information on the search query item. For example, a navigational suggestion of "perform internet search on the search item" may be provided, a navigation suggestion of "locate searched item in a designation information repository" may be provided, a navigation suggestion of "perform search for related information" may be provided, and the like. That is, in the navigation suggestions field 220, any of a number of suggested information navigation types or queries may be provided for assisting the searching user in discovering/browsing/obtaining additional information on the searched item.

Referring still to FIG. 2A, a number of results 225, 230, 235 are illustrated in the user interface component 210 that provide a variety of information results responsive to the queried search item. That is, based on the free text search query entered in the box/field 215, an automatic search for information associated with the queried search item from a variety of information sources, described above, may be performed, and results from each of a number of searched information sources may be provided in the user interface component 210 for review and additional navigation of the searching user. For example, the first result 225 may include information allowing the user to navigate to one or more other documents associated with the queried search item. The second result 230 may provide information allowing the user to navigate to one or more people associated with the queried search item, and the third result 235 may be provided for allowing the searching user to navigate to other information, for example, communications such as emails, text messages, telephone communications, and the like associated with the queried search item, or other information, for example, images, objects, research information, etc., associated with the queried search item.

As should be appreciated, the example results described in association with FIG. 2A are for purposes of example only and are not restrictive of the various types of information that may be obtained for a given queried search item and that may be presented to the searching user for additional navigation. Thus, as illustrated in FIG. 2A, a searching user may initiate a search on a given search item, and the user may be presented with information responsive to the queried search item that allows the user to not only review information responsive to the queried search item but that allows the user to efficiently navigate to additional information about the queried search item without requiring the user to close the searching application followed by the launching of a secondary application for browsing and/or discovering additional information about the searched item.

Figure 2B:
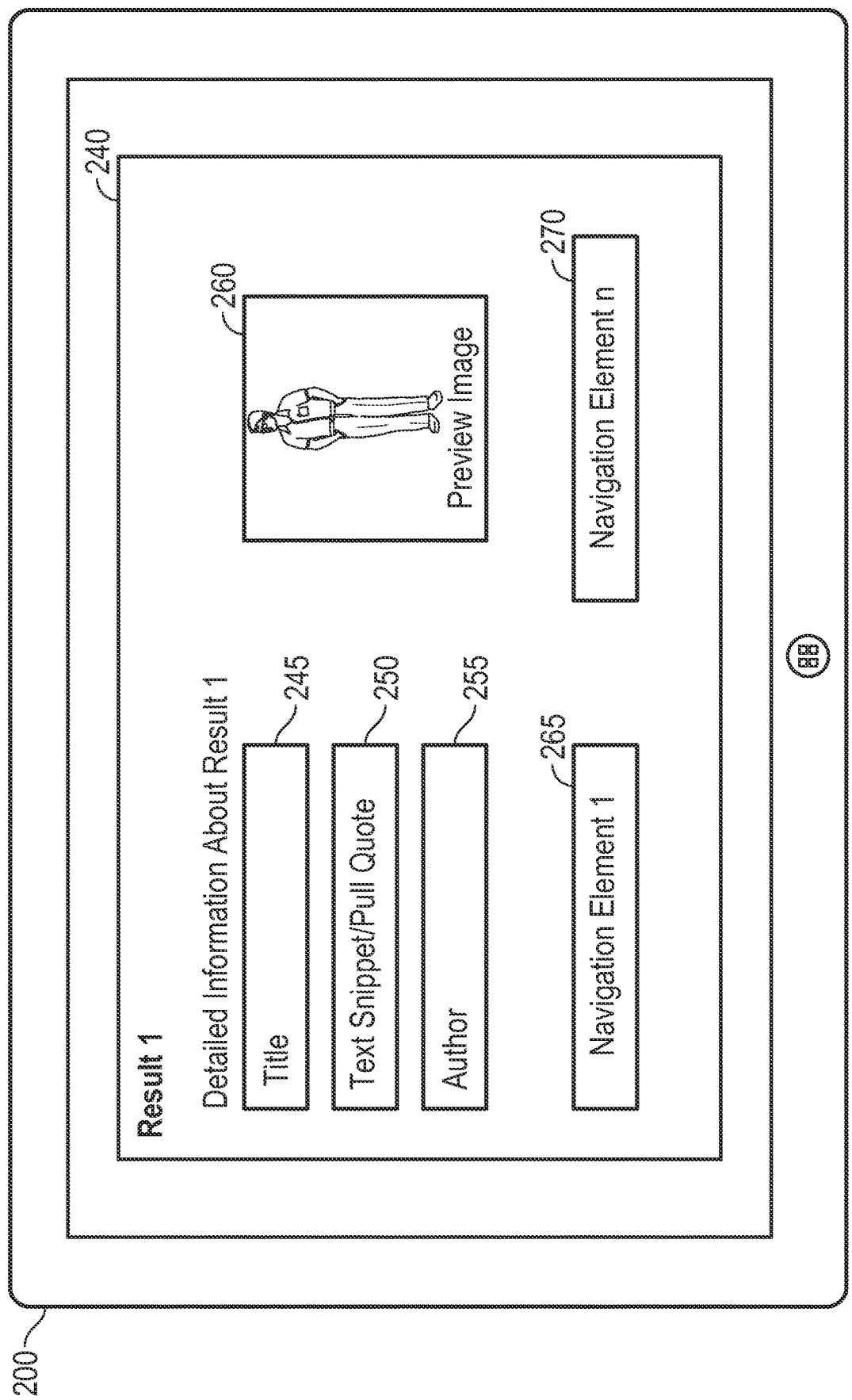
FIG. 2B illustrates an example user interface component in which detailed information and additional navigational elements may be provided in response to a given search item.

FIG. 2B illustrates an example user interface component in which detailed information and additional navigational elements may be provided in response to a given search item. As illustrated in FIG. 2B, any one of the result items 225, 230, 235 provided in response to the queried search item may be selected for reviewing the results of the initial search for a given result type. For example, as illustrated in FIG. 2B, the first result 225 included information about a document that is responsive to the search initiated by the searching user. In this example, upon selection of the result 225 from the user interface component 210, illustrated in FIG. 2A, additional detailed information about the result may be provided to the user. For example, a title of the document 245 may be presented, a text snippet or quote pulled from the document 250 may be presented, statistical information, such as document author, document editing dates, identification of persons reviewing or otherwise utilizing the document, and the like may be presented in a field 255, and a preview image of the document or an image illustrating one or more portions of the document may be provided in a field 260. Thus, by selecting the result 225 returned in response to the initial search, the user is allowed to navigate/browse to the additional information illustrated in FIG. 2B without launching a secondary browsing function. As should be appreciated, the layout and information types illustrated in FIG. 2B are for purposes of example only and are not limiting of different types of information that may be provided for an example document returned in response to a search item.

Referring still to FIG. 2B, two additional navigational elements 265, 270 are illustrated with which additional navigation for obtaining yet more information on the result item may be provided. That is, while the information illustrated for the first result may be in response to the initiated search query, additional navigational elements may be provided for the first result to allow yet more navigation to more information about the returned result that may be of use/interest to the user. For example, while the information contained in the first result 225 may be directly responsive to the initiated search, for example, a document responsive to the initiated search, the navigation elements 265, 270 may be utilized for navigating to additional information about the first result for allowing the user to dig even deeper into information that may be of interest in response to the user's search. For example, the user's initial search may be for a particular document, and the navigation elements 265, 270 may provide navigation to additional information about the document (e.g., people involved with the document) returned in response to the initial search.

According to an embodiment, and referring back to FIGS. 2A and 2B, each result (e.g., Result 1 (225)) need not be shown in a collapsed fashion (as illustrated in FIG. 2A), which when selected causes a display of associated information (as illustrated in FIG. 2B). That is, all of the information provided for a given result (as illustrated in FIG. 2B) may be provided with the associated result in the search results display (illustrated in FIG. 2A). Thus, in response to a given search, a display showing results of the search (FIG. 2A) and information associated with the results (FIG. 2B) may be shown in an expanded fashion in a single user interface component.

Figure 3A:
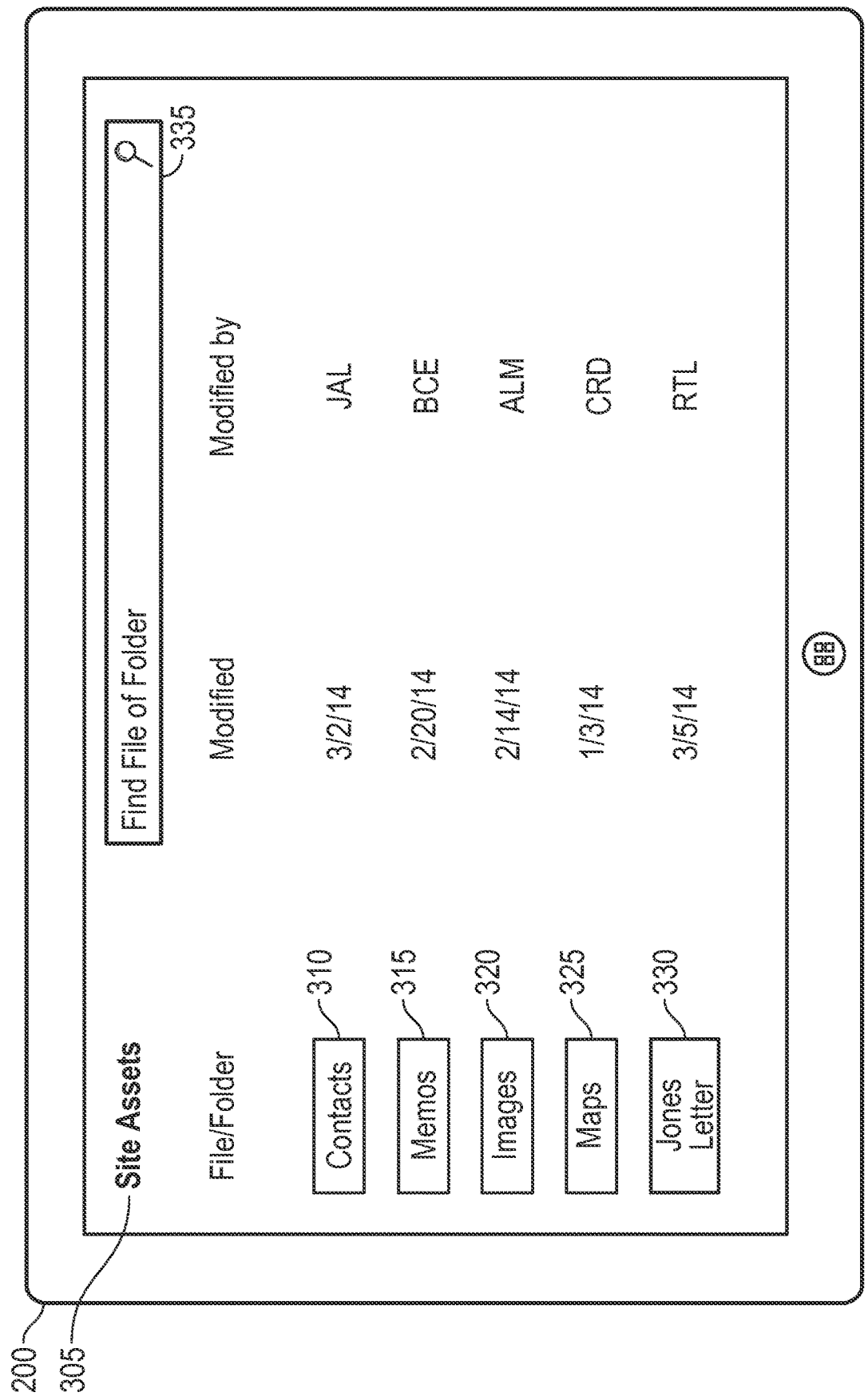
FIG. 3A illustrates a variety of content items contained in a structured information repository from which a search query may be initiated.

FIG. 3A illustrates a variety of content items contained in a structured information repository from which a search query may be initiated. As illustrated in FIG. 3A, another method for initiating a search or navigation query is illustrated. In addition to entering a free text search query, as illustrated above with respect to FIG. 2A, embodiments of the present invention provide for selecting a given content item from one or more content item repositories for initiating a search. For example, as illustrated in FIG. 3A, a structured file folder repository is illustrated in which a user might find a variety of information folders 310, 315, 320, 325, 330 that contain one or more documents or other content items available to the user. For example, the file/folder structure illustrated in FIG. 3A may be a typical file/folder structure maintained on a server at the user's place of business in which the user stores various documents or other content items.

According to embodiments of the present invention, a search query may be initiated for providing information responsive to the search and for providing navigational elements to other information responsive to the search by selecting a given content item such as a file designator or file folder designator from an information repository interface, as illustrated in FIG. 3A. For example, instead of entering a free text search query, as described above with reference to FIG. 2A, a user may select one of the files or file folders 310-330 illustrated in FIG. 3A for automatically initiating a search on the selected item. Alternatively, a user may enter a file or folder designation in the search field 335. In response to selecting a given file or file folder, or in response to searching for a given file or file folder, search results information and additional navigational functionality may be provided to the searching user, as illustrated in FIG. 3B.

Figure 3B:
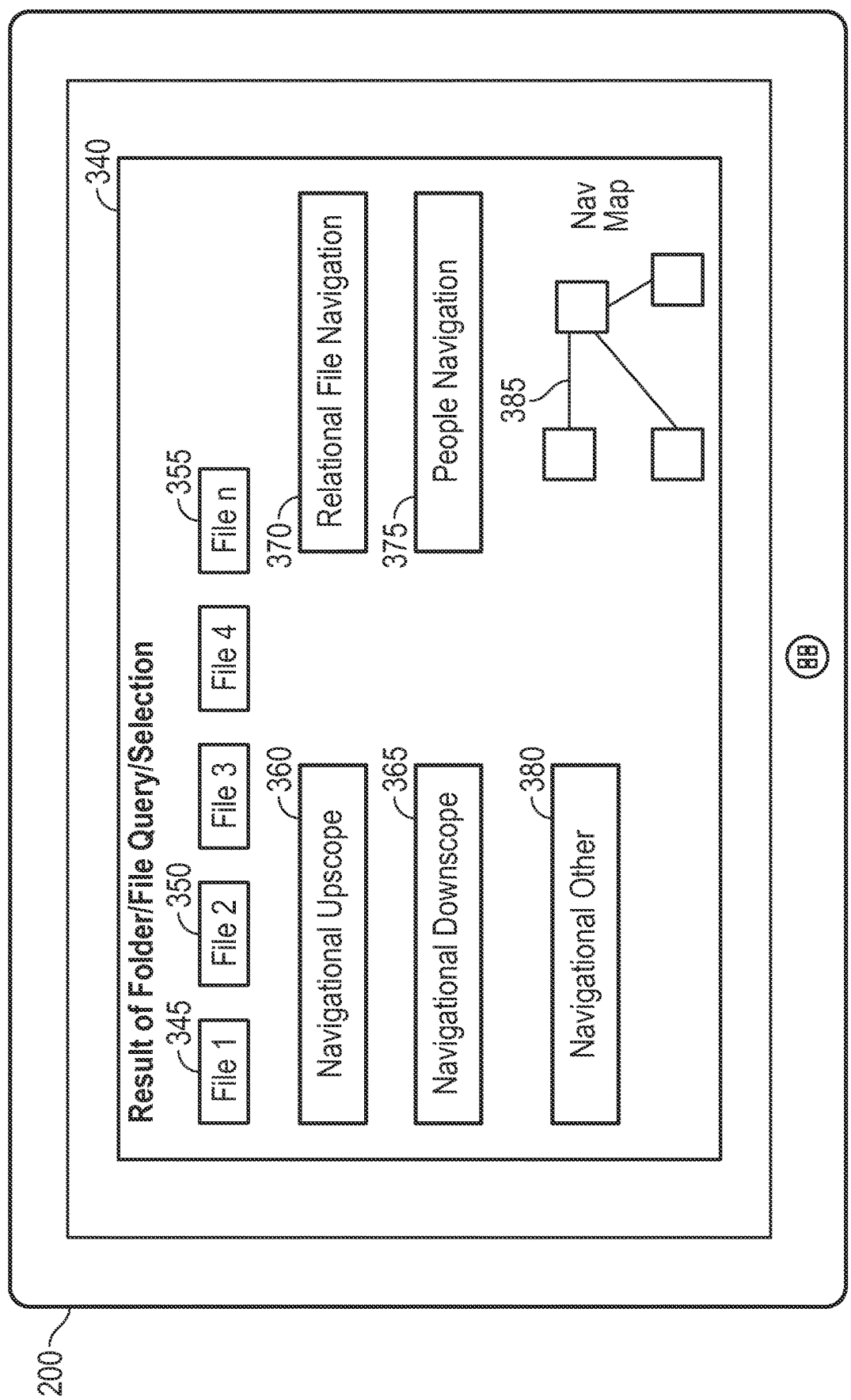
FIG. 3B illustrates an example user interface component in which detailed information and additional navigational elements may be provided in response to a given search item.

Referring to FIG. 3B, in response to selecting or searching for a given file or file folder, from the structured file/file folder repository illustrated in FIG. 3A, files 345, 350, 355 and additional navigational elements 360, 365, 370, 375, 380 may be provided in a user interface component 340, as illustrated in FIG. 3B. For example, in response to selecting a given file folder illustrated in the user interface component in FIG. 3A, a variety of files 345, 350, 355 may be presented to the user in the user interface component 340 illustrated in FIG. 3B for allowing the user to select a given file responsive to the user's initial file folder selection. In addition, a navigational up scope element 360 may be provided for allowing the user to navigate upward in a hierarchy of associated files, for example, allowing the user to navigate to files or documents that are parent files or documents to the presently selected file. A navigational down scope element 365 is illustrated for allowing the user to navigate in a downward direction in a hierarchical file structure, for example, for navigating to documents and/or files that are hierarchically designated as children of the presently selected file or document. Thus, through up scoping or down scoping, a user may review documents from which the presently selected document was generated, and similarly, the user may review documents that have been generated from or contain information contained in the presently selected file or document.

The relational file navigation element 370 is illustrative of a function for allowing the user to navigate to documents that may be otherwise related to the presently selected file or document owing to relational designations of various types. For example, other documents containing metadata that indicate a relationship to the presently selected file or document may be searched. For example, all documents created by the same author of the presently selected file or document may be searched, all documents edited by the same person who has edited the presently selected file or document may be searched, etc.

A people navigation element 375 is illustrative of a navigation function for allowing the user to navigate to information about people associated in some way with the result of the present search query. For example, if the present search query is directed to a given file or document, the people navigation element 375 may be utilized for obtaining information on those persons associated with the file or document in some manner. For example, all persons contained in a collaborative work group in which the document was generated may be provided for the searching user including hierarchical relationships between the searched persons, for example, managers, direct reports, and the like.

A navigation map 385 is illustrative of a graphical representation of the presently searched file or document in association with other files, documents, objects, etc. For example, a mapping showing a parent child relationship between the presently searched document and other documents may be provided as a navigation map 385. As should be appreciated, the navigation components, the navigation map and other user interface components illustrated and described with respect to FIG. 3B are for purposes of example only, and are not limiting of other search and navigation queries that may be presented in response to a given search.

While the example searchable items/results illustrated in FIGS. 3A and 3B are illustrated in a different fashion than the general search/results interfaces illustrated in FIGS. 2A and 2B, it should be understood that the search user interface illustrated in FIG. 2A may be utilized for searching the items illustrated in FIG. 3A. Thus, the general search/results interface illustrated in FIG. 2A may be utilized for searching or browsing files or file folders of a structured or other type of file system where the searched file or file folder name/designation or URL may be entered in the query field/box 215 illustrated in FIG. 2A. That is, the user interfaces illustrated in FIGS. 3A and 3B may be examples of specialized search/results interfaces, but the general search/results interfaces illustrated in FIGS. 2A and 2B are equally useful. In addition, as described above for FIGS. 2A and 2B, the results of a search on a file or file folder need not be shown across two interfaces as illustrated in FIGS. 3A and 3B, but instead, the search results and results details (additional information) may be shown in an expanded fashion in a single interface component.

Figure 4A:
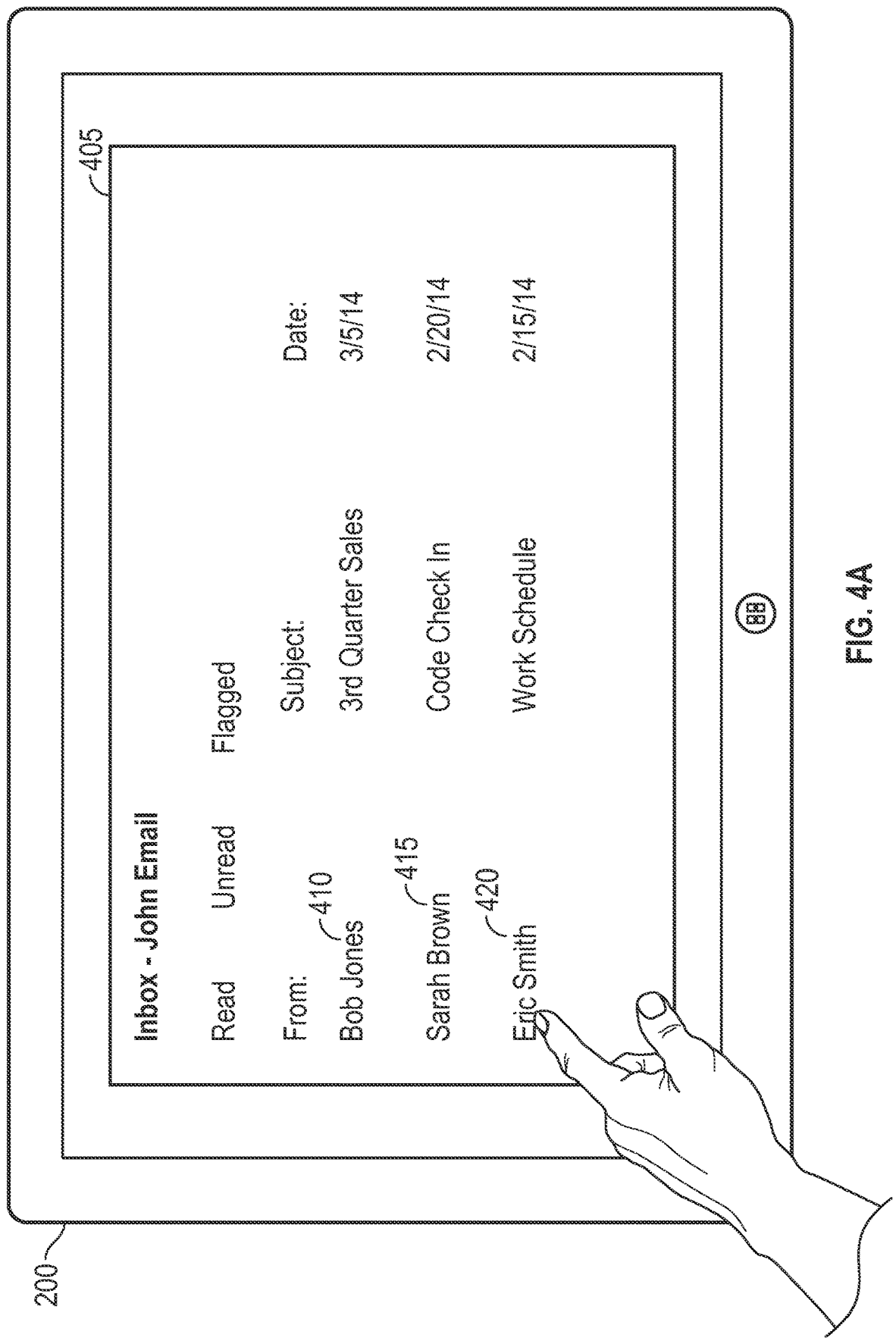
FIG. 4A illustrates an example electronic mail user interface in which is illustrated a variety of electronic mail items from which a search query may be initiated.

In addition to free text query entry, described above with reference to FIG. 2A and file, folder, document, object selection illustrated and described above with reference to FIG. 3A, any other suitable means for initiating a search query may be utilized for obtaining additional navigational functions, as described herein. As illustrated in FIG. 4A, a search on a particular person may be initiated by selecting a person's name from a user interface component such as an electronic mail user interface, a text messaging user interface, a telephone call log, and the like. That is, in any location in which a person's name is listed, selection of the person's name may be utilized for initiating a search and for obtaining additional navigational information in response to a returned search item in accordance with embodiments of the present invention. In FIG. 4A, an electronic mail inbox 405 is illustrated in which communications to and/or from a number of persons 410, 415 are illustrated. According to embodiments of the present invention, selection of one of the displayed names, for example, the displayed name 420 may cause an automatic population of the selected name into a search field for searching on the selected name for obtaining information about the person associated with the selected name and for providing additional navigational functions for obtaining additional information on the searched name.

Figure 4B:
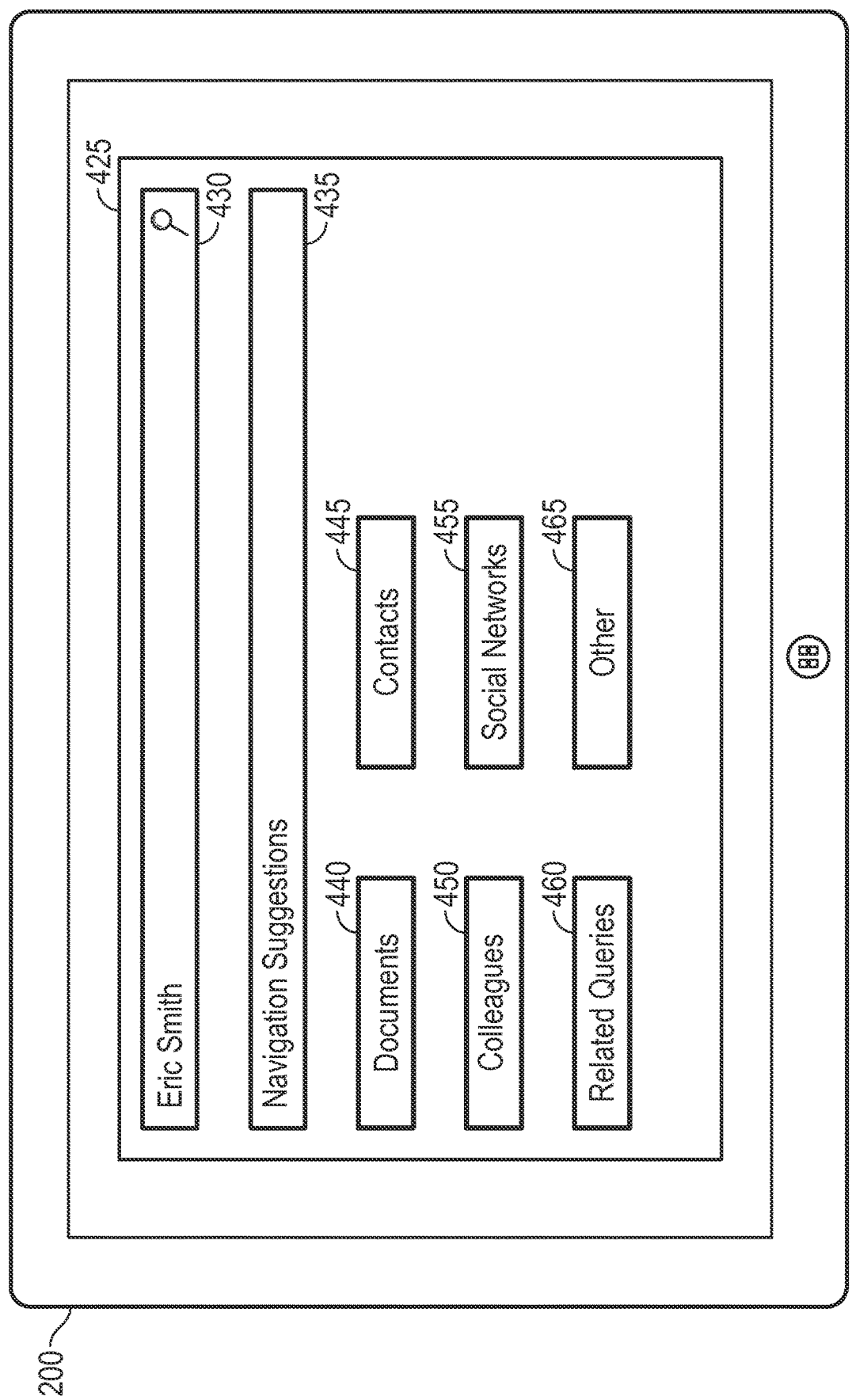
FIG. 4B illustrates an example user interface component in which detailed information and additional navigational elements may be provided in response to a given search item.
Figure 5:
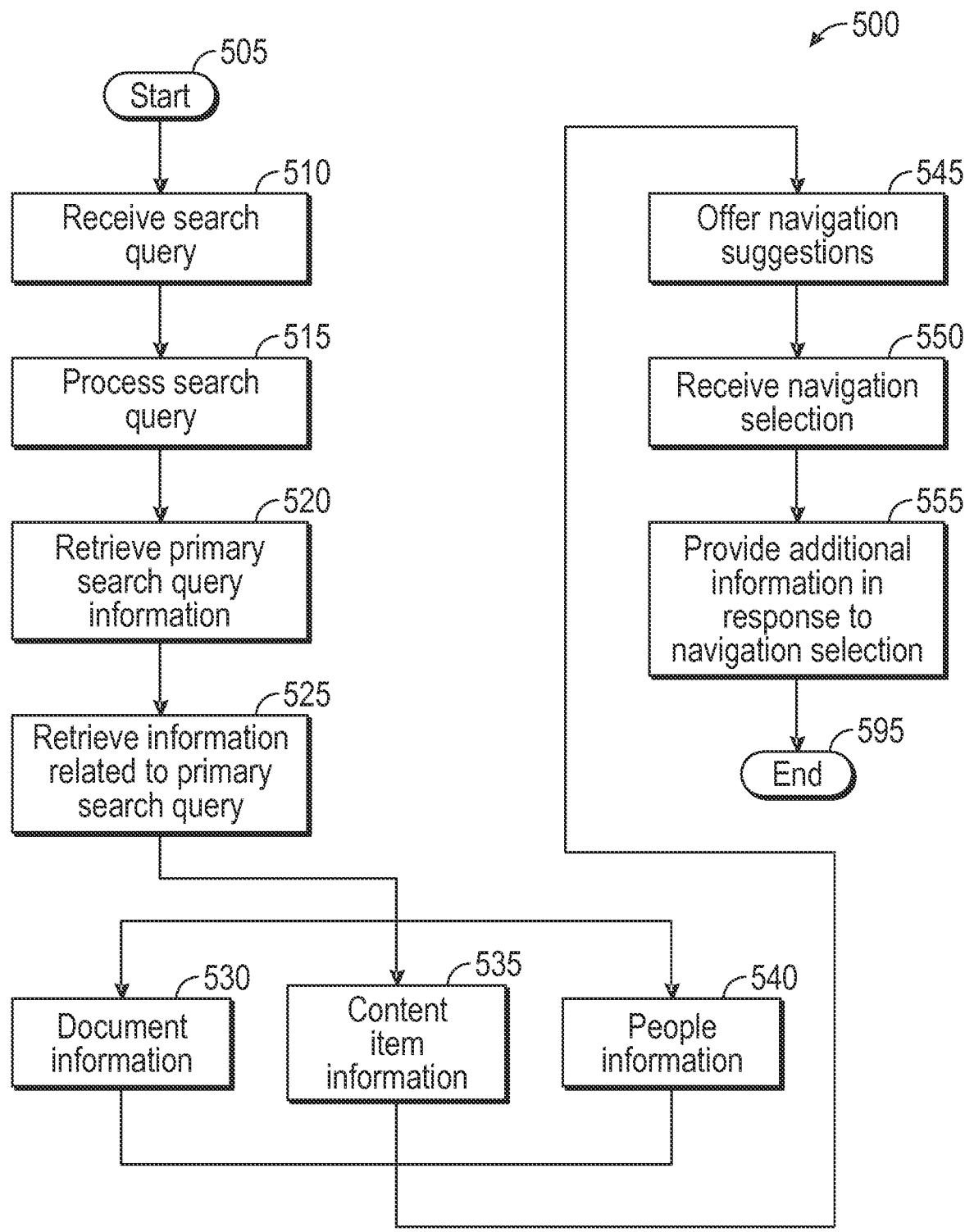
FIG. 5 is a flowchart illustrating a method for search and navigation through navigational queries across a variety of information sources.

Referring then to FIG. 4B, in response to selecting the example name "Eric Smith" 420 from the email inbox 405, illustrated in FIG. 4A, the name "Eric Smith" is automatically populated into the search field 430 for initiating a search on the selected name. According to one embodiment, selecting the name or any other identified information item may automatically initiate a search without a need for populating the selected name or information item into a search query field. In response to initiating a search on the selected name, a variety of navigation suggestions 435 may be provided for suggesting various navigation types that may be initiated by the user on the searched name, as described above in reference to FIG. 2B. Referring still to FIG. 4B, a number of additional navigation functions 440, 445, 450, 455, 460, 465 may be provided in response to the search on the selected name for providing navigation to additional information associated with the searched name. For example, the documents navigation function 440 may allow for a navigation to various documents associated with the searched person, for example, documents authored by the searched person, edited by the searched person, or documents associated with a collaborative work group in which the searched person is included.

The colleagues navigation function 450 may allow navigation to information about the searched person's colleagues, for example, the searched person's manager, direct reports, work group associates, and the like. A contacts navigation function 445 may allow for navigation to contacts information of the searched person, and the social networks function 445 may allow a search on information contained in various social networks utilized by the searched person or in which the searched person is identified. Other navigation functions 460, 465 may provide for a variety of different search results and navigation functions for obtaining additional information about the searched person.

As mentioned above with respect to FIGS. 3A and 3B. The search/results interfaces illustrated in FIGS. 4A and 4B may be considered specialized examples of the general search/results interfaces illustrated in FIGS. 2A and 2B. That is, while the example searchable items/results illustrated in FIGS. 4A and 4B are illustrated in a different fashion than the general search/results interfaces illustrated in FIGS. 2A and 2B, it should be understood that the search user interface illustrated in FIG. 2A may be utilized for searching the items illustrated in FIG. 4A. In addition, as described above for FIGS. 2A and 2B, the results of a search on a given item (e.g., an electronic mail item) need not be shown across two interfaces as illustrated in FIGS. 3A and 3B, but instead, the search results and results details (additional information) may be shown in an expanded fashion in a single interface component. In this case, the example selected name may be automatically populated in the search field/box 215 illustrated in FIG. 2A, and search results may be provided accordingly.

The illustrations and descriptions of FIGS. 2A through 4B are for purposes of example only and are not restrictive of other types of searches that may be performed for which navigational elements may be automatically provided for allowing navigation to additional information that may be discovered or browsed by a searching user in association with a searched item. For example, an Internet search performed in an Internet browser may be utilized for obtaining one or more search results and for launching a search results and navigation user interface, such as those interfaces illustrated in FIGS. 2B, 3B and 4B, a voice activated or gesture activated search may be initiated through an appropriate voice controlled search function or gesture controlled search function for initiating a search for which navigation functions for obtaining additional information may be provided. That is, any search for any information item may be utilized for initiating the functionality described herein wherein additional information associated with the searched item may be obtained and navigational functions for allowing navigation to those additional information items may be provided. In addition, when a given navigation suggestion is followed or when a navigation element is selected, additional navigation suggestions/elements may be provided at a next level of navigation.

As should be understood, the navigation components illustrated in FIGS. 2B, 3B, 4B may be interchanged where any number or type of navigation component may be provided based on the searched item and the availability of additional information that may be discovered/browsed by the searching user. According to one embodiment various navigation components may be pre-defined and stored in a repository of navigation components that are called by the search/navigation application 120 for population into a navigation user interface such as illustrated in FIGS. 2B, 3B and 4B at the time of a search. Alternatively, navigation elements may be generated dynamically at the time of a search based on information available for a given search item.

Having described a system architecture for gathering and aggregating information associated with various potential search items and having described various types of information searches and user interface components for providing information and navigational functions with respect to FIGS. 1 through 4B, FIG. 5 is a flowchart illustrating a method for search and navigation through navigational queries across a variety of information sources. The routine 500 begins at start operation 505 and proceeds to operation 510 where a search query is received from a searching user, as described above with reference to FIGS. 2A through 4B. Receiving a search query may include receiving an explicit search query entered for a search on an information item (e.g., a search query entered into a search field/box 215), and/or receiving a search query may include receiving an implicit search query on the information item in response to a user action on the information item (e.g., a user click or tap on a given information item).

At operation 515, the received search query is processed by searching one or more available information sources for information associated with or responsive to the received search query. At operation 520, search information directly responsive to the received search query is retrieved. For example, if the received search query is for a particular document, then at operation 520, the particular searched document is located and retrieved for provision to the searching user.

At operation 525, information related to the result of the primary search query is retrieved from one or more sources, for example, document information 530, content item information 535, people information 540, or the information may be retrieved from an activity stream 116, described above with reference to FIG. 1. Information related to the primary search term may be obtained from a variety of information sources including structured file/folder systems, Internet-based search systems, aggregated information data that has been aggregated by an analysis of content items that are associated with the received search item and placed in a graph of information associated with the searched item, search strings obtained by performing pattern recognition on a received search string, and information obtained in association with clustering between documents or other content items and similar content items. In addition, information associated with people including information from one or more social networking systems may be retrieved.

At operation 545, a result of the received search query is provided including an offering of one or more navigation suggestions or one or more navigation elements for automatically navigating to other information of various types, as described above. At operation 550, a navigation suggestion is entered or a navigation element is selected for navigating to other information related to the received search query. At operation 555 additional information in response to the navigation selection is provided, as illustrated above with reference to FIG. 2B. The routine 500 ends at operation 595.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), hand-held devices, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 6:
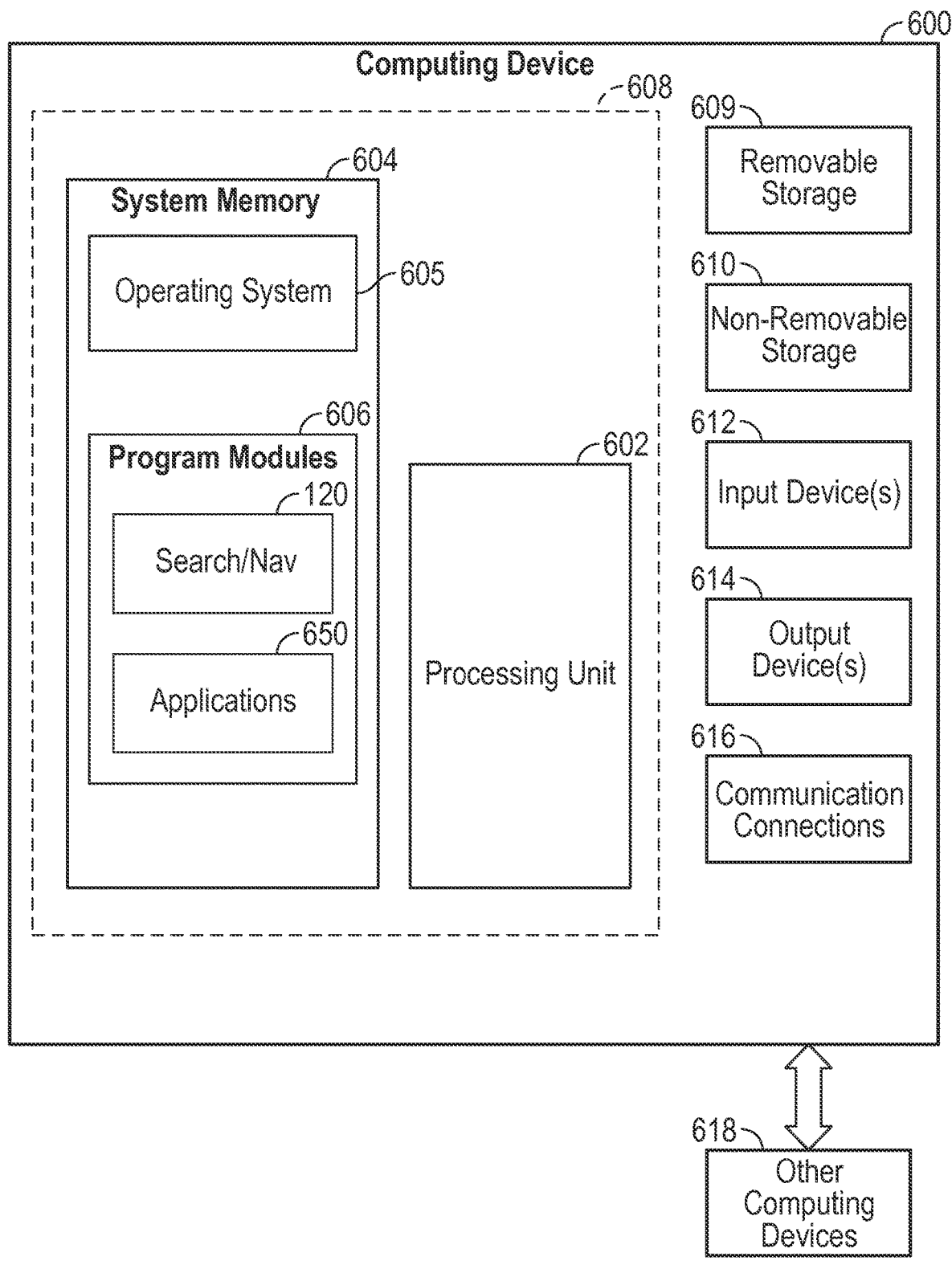
FIG. 6 is a block diagram illustrating example physical components of a computing device with which embodiments of the invention may be practiced.
Figure 7A:
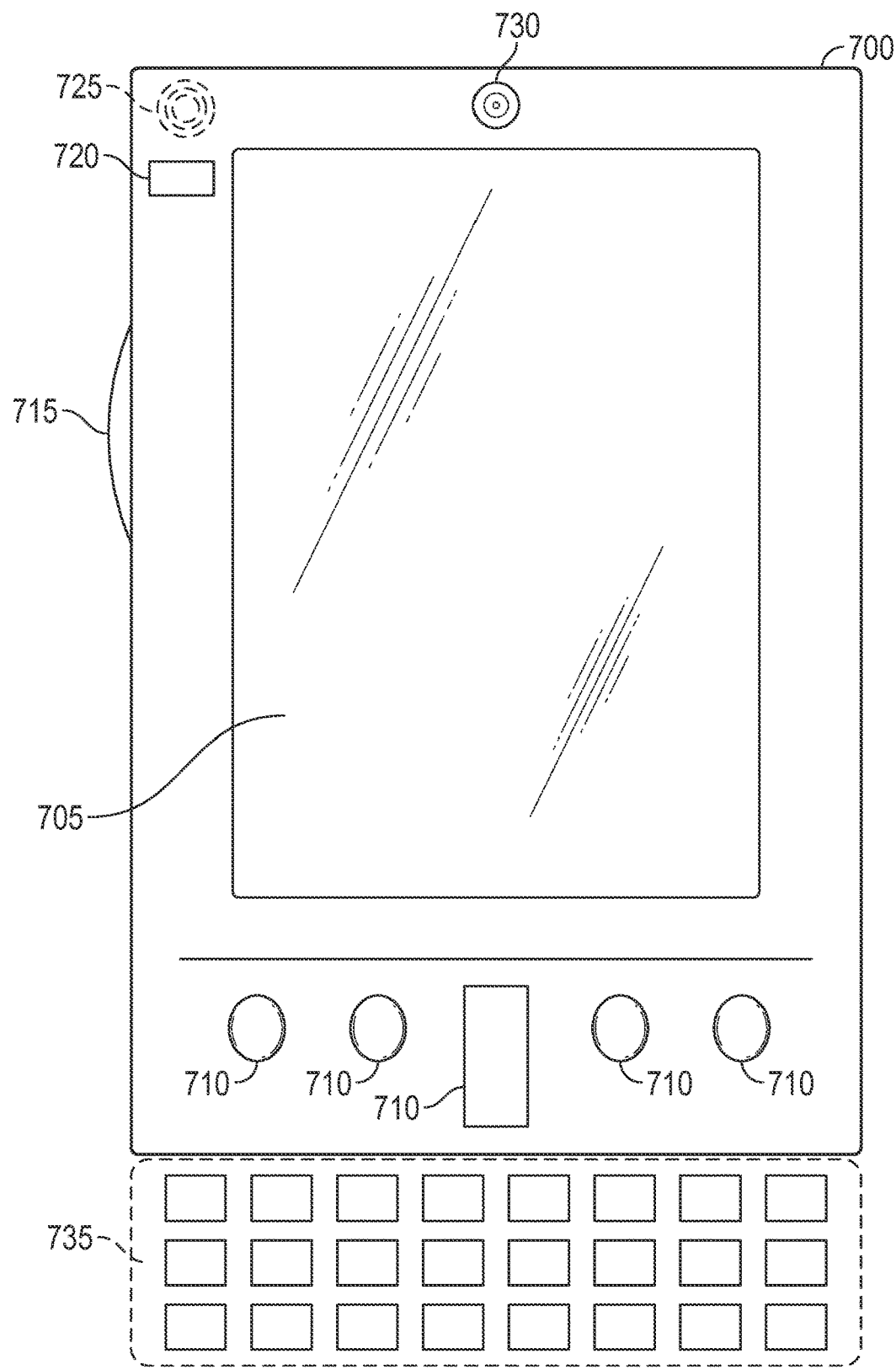
FIGS. 7A and 7B are simplified block diagrams illustrating components of a mobile computing device with which embodiments of the invention may be practiced.
Figure 7B:
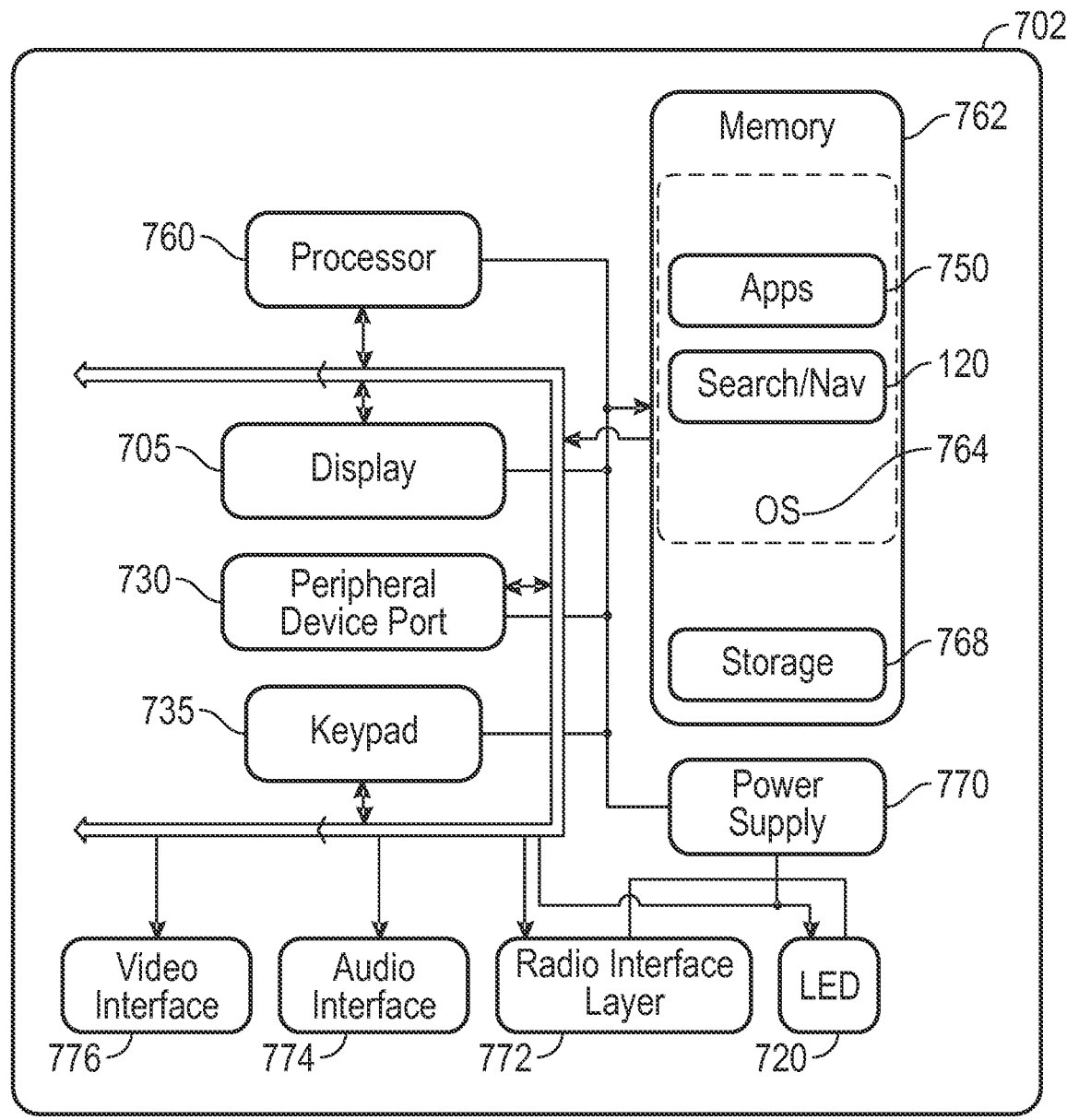
Figure 8:
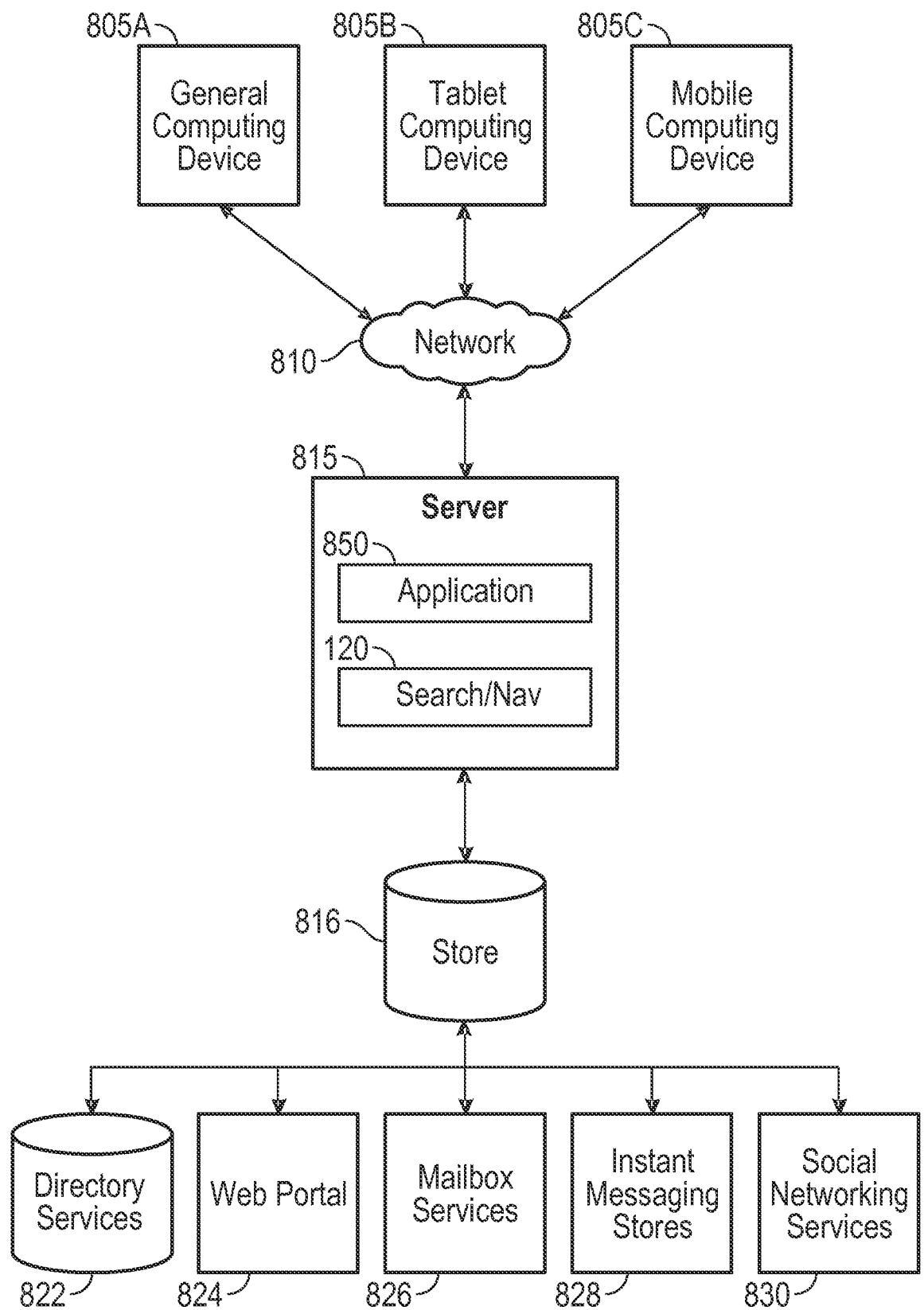
FIG. 8 is a simplified block diagram of a distributed computing system in which embodiments of the invention may be practiced.

FIGS. 6-8 and the associated descriptions provide a discussion of a variety of operating environments in which embodiments of the invention may be practiced. However, the devices and systems illustrated and discussed with respect to FIGS. 6-8 are for purposes of example and illustration and are not limiting of a vast number of computing device configurations that may be utilized for practicing embodiments of the invention, described herein.

FIG. 6 is a block diagram illustrating physical components (i.e., hardware) of a computing device 600 with which embodiments of the invention may be practiced. The computing device components described below may be suitable for the client device 118 described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 650 such as the search and navigation application 120. The operating system 605, for example, may be suitable for controlling the operation of the computing device 600. Furthermore, embodiments of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 may perform processes including, but not limited to, one or more of the stages of the method 500 illustrated in FIG. 5. Other program modules that may be used in accordance with embodiments of the present invention and may include applications such as electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing an activity stream across multiple workloads may be operated via application-specific logic integrated with other components of the computing device 600 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which embodiments of the invention may be practiced. With reference to FIG. 7A, one embodiment of a mobile computing device 700 for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (i.e., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 750 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 750, including the search and navigation application 120, may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world," via a communications carrier or service provider. Transmissions to and from the radio 772 are conducted under control of the operating system 764. In other words, communications received by the radio 772 may be disseminated to the application programs 750 via the operating system 764, and vice versa.

The visual indicator 720 may be used to provide visual notifications and/or an audio interface 774 may be used for producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present invention, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one embodiment of the architecture of a system for providing an activity stream across multiple workloads, as described above. Content searched/navigated to, interacted with, or edited in association with the application 120 may be stored in different communication channels or other storage types. For example, various documents may be stored using a directory service 822, a web portal 824, a mailbox service 826, an instant messaging store 828, or a social networking site 830. The application 120 may use any of these types of systems or the like for providing search and navigation across various information sources, as described herein. A server 130 may provide the application 120 to clients 125. As one example, the server 130 may be a web server providing the application 120 over the web. The server 130 may provide the application 120 over the web to clients 125 through a network 140. By way of example, the client computing device 125 may be implemented and embodied in a personal computer 805A, a tablet computing device 805B and/or a mobile computing device 805C (e.g., a smart phone), or other computing device. Any of these embodiments of the client computing device may obtain content from the store 816.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for providing navigational queries across information sources, comprising:
   in response to receiving, via a user interface of an application, a search query for an information item, initiating, via the application, a search function to process the search query for the information item;
   displaying, via the user interface, search query results comprising result items responsive to the search query;
   receiving, via the user interface, a selection of a result item in the search query results;
   in response to the selection of the result item, initiating, via the application, a browsing function to discover additional information items relating to the selected result item; and
   displaying, via the user interface, information relating to the selected result item and navigational elements for navigating to the additional information items discovered that relate to the selected result item, wherein each navigational element corresponds to a particular type of the additional information items discovered and is selectable to navigate to respective additional information items of the particular type.

2. The method of claim 1, wherein initiating the browsing function includes extracting one or more entities that are associated with the selected result item.

3. The method of claim 2, wherein extracting the one or more entities that are associated with the selected result item is based on a knowledge graph associated with the selected result item.

4. The method of claim 2, wherein extracting the one or more entities that are associated with the selected result item is based on clustering between the selected result item and similar entities.

5. The method of claim 2, wherein extracting the one or more entities that are associated with the selected result item is based on pattern recognition in the additional information items as compared to pattern recognition in the selected result item.

6. The method of claim 2, wherein the one or more entities include activities that are associated with the selected result item.

7. The method of claim 2, wherein the one or more entities include documents that are associated with the selected result item.

8. A system for providing navigational queries across information sources, comprising:
   a search engine operative to:
     in response to receiving, via a user interface of an application, a search query for an information item, initiate, via the application, a search function to process the search query for the information item;
     display, via the user interface, search query results comprising result items responsive to the search query;
     receive, via the user interface, a selection of a result item in the search query results;
     in response to the selection of the result item, initiate, via the application, a browsing function to discover additional information items relating to the selected result item; and
     display, via the user interface, information relating to the selected result item and navigational elements for navigating to the additional information items discovered that relate to the selected result item, wherein each navigational element corresponds to a particular type of the additional information items discovered and is selectable to navigate to respective additional information items of the particular type.

9. The system of claim 8, wherein initiating the browsing function includes extracting one or more entities that are associated with the selected result item.

10. The system of claim 9, wherein extracting the one or more entities that are associated with the selected result item is based on a knowledge graph associated with the selected result item.

11. The system of claim 9, wherein extracting the one or more entities that are associated with the selected result item is based on clustering between the selected result item and similar entities.

12. The system of claim 9, wherein extracting the one or more entities that are associated with the selected result item is based on pattern recognition in the additional information items as compared to pattern recognition in the selected result item.

13. The system of claim 9, wherein the one or more entities include activities that are associated with the selected result item.

14. The system of claim 9, wherein the one or more entities include documents that are associated with the selected result item.

15. Computer storage media including computer readable instructions, which when executed by a processing unit is operable to perform a method, the method comprising:

in response to receiving, via a user interface of an application, a search query for a document, initiating, via the application, a search function to process the search query for the document;

displaying, via the user interface, search query results comprising result items responsive to the search query;

receiving, via the user interface, a selection of a result item in the search query results;

in response to the selection of the result item, initiating, via the application, a browsing function to discover additional information items relating to the document; and displaying, via the user interface, information relating to the selected result item and navigational elements for navigating to the additional information items discovered that relate to the selected result item, wherein each navigational element corresponds to a particular type of the additional information items discovered and is selectable to navigate to respective additional information items of the particular type.

16. The computer storage media of claim 15, wherein initiating the browsing function includes extracting one or more entities that are associated with the document.

17. The computer storage media of claim 16, wherein extracting the one or more entities that are associated with the document is based on a knowledge graph associated with the document.

18. The computer storage media of claim 16, wherein extracting the one or more entities that are associated with the document is based on clustering between the document and similar entities.

19. The computer storage media of claim 16, wherein extracting the one or more entities that are associated with the document is based on pattern recognition in the additional information items as compared to pattern recognition in the document.

20. The computer storage media of claim 16, wherein the one or more entities include activities that are associated with the document.

* * * * *